United States Patent [19]

Lollis et al.

[11] 4,237,936
[45] Dec. 9, 1980

[54] PIG TRAP CLOSURE

[75] Inventors: Jack D. Lollis; David J. Hicks, both of Tulsa, Okla.

[73] Assignee: T. D. Williamson Inc., Tulsa, Okla.

[21] Appl. No.: 910,432

[22] Filed: May 30, 1978

[51] Int. Cl.³ .................. F16L 55/10; G01M 3/00
[52] U.S. Cl. ............................. 138/90; 73/49.5; 285/409
[58] Field of Search ............... 138/89, 90; 116/266; 73/49.5; 166/92; 285/409

[56] References Cited

U.S. PATENT DOCUMENTS

| | | | |
|---|---|---|---|
| 1,200,266 | 10/1916 | Strausser | 138/89 X |
| 1,588,392 | 6/1926 | Comp | 138/90 |
| 2,246,885 | 6/1941 | Jones | 138/90 |
| 2,462,575 | 2/1949 | Walker | 138/90 X |
| 3,070,129 | 12/1962 | Poulallion et al. | 138/89 |
| 3,548,881 | 12/1970 | Pavan | 138/89 |
| 3,672,403 | 6/1972 | Wilson et al. | 138/89 |

FOREIGN PATENT DOCUMENTS 1472750  5/1975  United Kingdom ............ 285/409

Primary Examiner—Daniel M. Yasich

[57] ABSTRACT

A pig trap closure is disclosed which includes a collar adapted to be attached to the end of a pipe, a door for opening and closing the end of the pipe, means for clamping the door to the collar and sealing means for preventing communication between the interior of the pipe and the atmosphere when the door is clamped to the collar. A testing valve is provided for indicating the presence of pressurized fluid in the pipe and means connects the testing valve to a handle used to unclamp the door for preventing movement of the handle until after the presence of pressurized fluid within the pipe has been checked by the testing valve.

6 Claims, 5 Drawing Figures

PIG TRAP CLOSURE

The use of traps to insert pigs into or withdraw pigs from a pipeline is well known. Typically, these traps are closed at one end by a door or cap to prevent communication between the interior of the pipeline and the atmosphere. When a pig is to be inserted, the door is opened, the pig inserted and the door closed for launching the pig into the pipeline. To withdraw the pig from the pipeline, the pig runs into a pipe of the trap, the door opened and the pig removed. Difficulties may arise because the device used to close the pipe in the trap does not seal or does not properly close or because the device is prematurely opened while the trap is under pressure. It has therefore been suggested to provide a testing valve which tests for the presence of pressurized fluid within the trap.

One of these traps is closed by a cap which is threaded to a portion of the trap and is sealed by an O-ring. A testing valve for indicating the presence of pressurized fluid in the trap includes a seat and a ball which is urged to the seat by a seating screw. When the screw is backed off, any pressure in the trap will unseat the ball and the escaping fluid is indicative of the pressure in the trap. An example of this arrangement is the model FIG. 500 closures of Huber-Yale.

In accordance with the invention, a pig trap closure is disclosed that comprises a collar adapted to be attached to the end of a pipe which is to receive a pig and a door is pivotally connected to the collar for opening and closing the end of the pipe. Means are provided for clamping the door to the collar including semicircular sections forming a clamping ring around the pipe, lips being provided on the inner surface of the ring for engaging with flanges on the door and collar for clamping to one another, one end of the sections being hinged together and the other ends being movable together for clamping the door to the collar when the lips engage the flanges on the door and collar and apart for unclamping the door from the collar. A latching mechanism is used for moving the other ends together and apart includes a mechanical linkage pivotally connected to each of the other ends and a handle attached to the linkage for controlling movement of these ends between opened and closed positions. A fluid energized sealing means is used to prevent communication between the interior of the pipe and the atmosphere when the door is clamped to the collar. A testing valve is provided to indicate the presence of pressurized fluid in the pipe and includes a housing connected to the collar having an inlet passage in communication with the interior of the pipe, an outlet passage in communication with the inlet passage and the atmosphere, a seat within the housing intermediate of the inlet and outlet passages, a ball disposed within the housing for engaging the seat to prevent communication between the inlet and outlet passages, and a stem assembly for urging the ball toward the seat and having a push rod extending into the housing for contacting the ball and threads for engaging mating threads on the housing to move the push rod toward and away from the seat, the presence of pressurized fluid being indicated by fluid flowing through the housing into the atmosphere when the push rod is moved away from the seat. A means connecting the testing valve to the handle is used for preventing movement of the handle to open the door until after the push rod is moved away from the seat and the stem assembly removed from the housing to test for the presence of pressurized fluid within the pipe.

In the drawings in which like reference characters are used throughout to indicate like parts:

Figure 1:
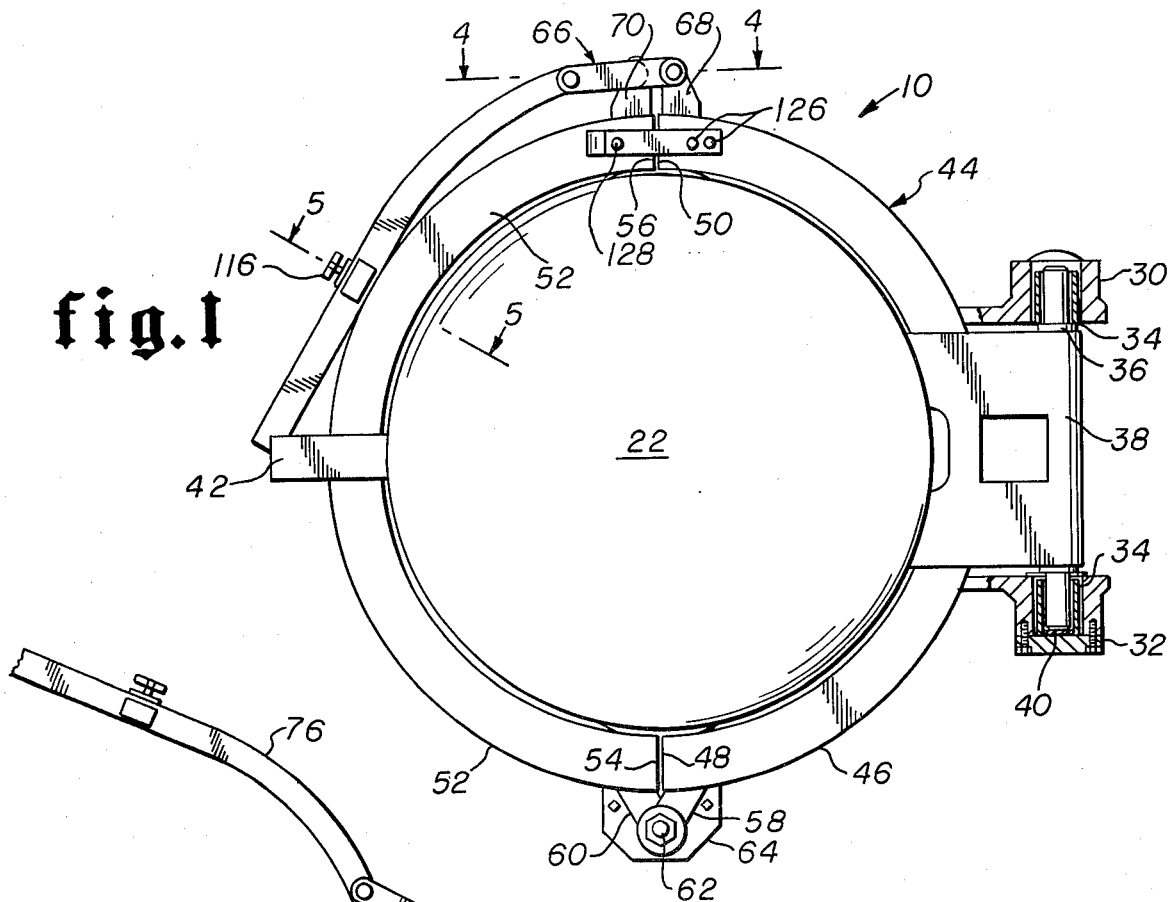
FIG. 1 is a front elevational view, partly in section, of a preferred embodiment constructed according to the present invention showing the door clamped to the collar.

Turning now to the drawings, there is shown a pig trap closure 10 attached to a pipe 12 which is to receive a pig (not shown).

Closure 10 includes a collar 14 which is adapted to be attached to the end of pipe 12. Collar 14 has an end 16 which is welded to the end of pipe 12 and also with a male portion 18 provided at the other end of the collar to extend away from the end of the pipe. Further, a flange portion 20 is provided on collar 14 to extend in the direction of the pipe's exterior around the collar.

Figure 2:
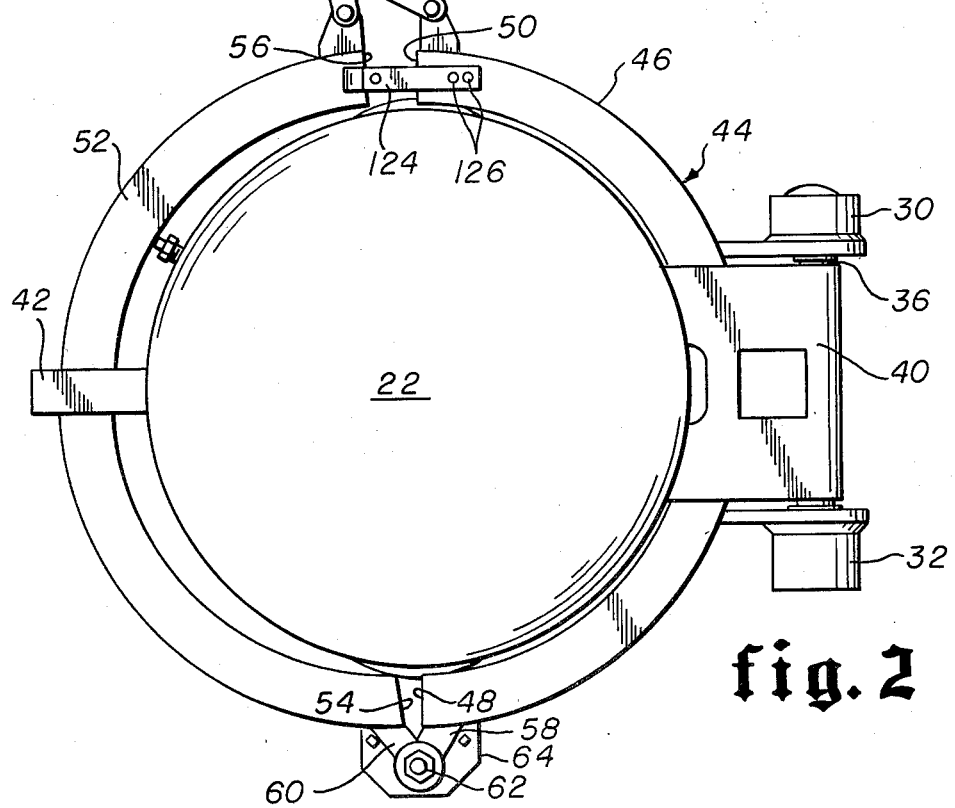
FIG. 2 is a front elevational view of the embodiment shown in FIG. 1 with the door unclamped from the collar.
Figure 3:
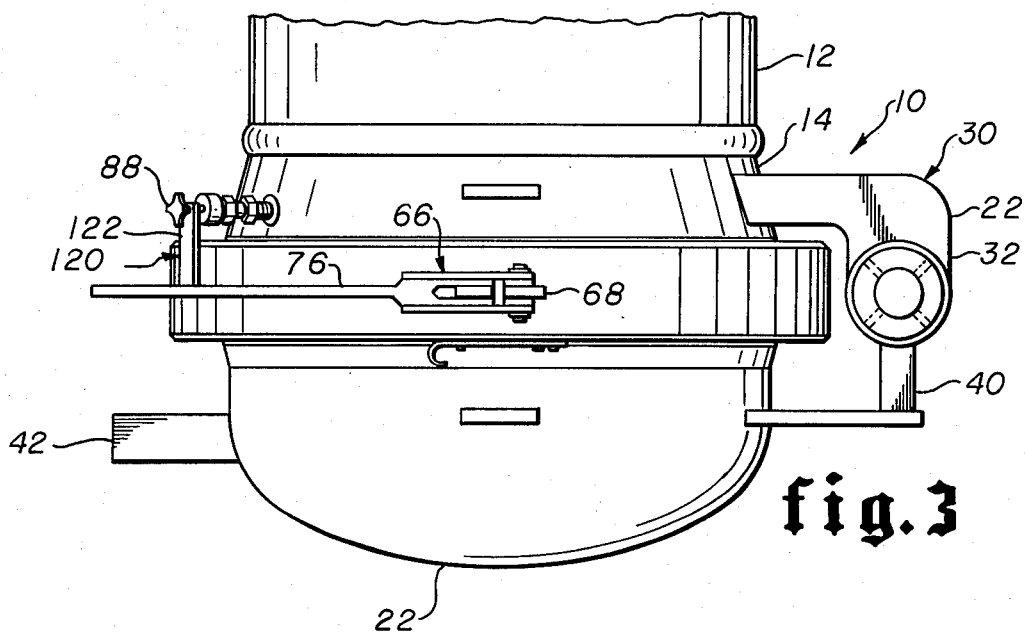
FIG. 3 is a top plan view of the embodiment shown in FIG. 1.
Figure 4:
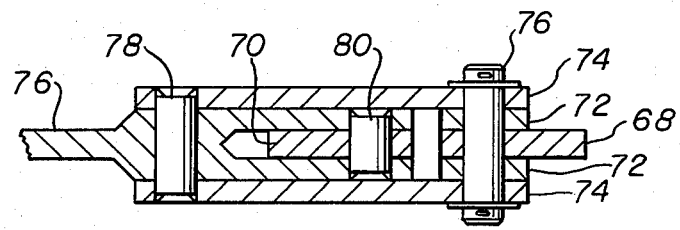
FIG. 4 is a view of the embodiment shown in FIG. 1 taken in the direction of arrows 4—4.

A door 22 is pivotally connected to collar 14 for opening and closing the trap. As shown in FIGS. 1-3, door 22 is a dome shaped body having a female portion 24 telescoping over male portion 18 on the collar when the door is in its closed position. The female portion has a sufficient depth to permit variations in the spacing between facing shoulders on the collar and door. Further, female portion 24 has a flange portion 28 extending outwardly from the body and circumferentially around the door edge.

A bracket is attached to the side of collar 14 for pivotally connecting the door thereto. The bracket has an upper arm 30 and a lower arm 32 supporting a bearing housing 34 at their outer ends. An axle 36 is pivotally mounted in each housing 34 between each housing and one end of "L" shaped member 38 is attached to axle 36 and the other end is attached to door 22. Shims 40 are provided in the housing 34 of lower arm 32 for adjusting the position of door 22 to insure that female portion 26 telescopes over male portion 18 when door 22 is closed. A handle 42 is disposed on the side opposite from plate 40 so that door 22 may be pivoted from the closed to opened positions and vice versa.

Figure 5:
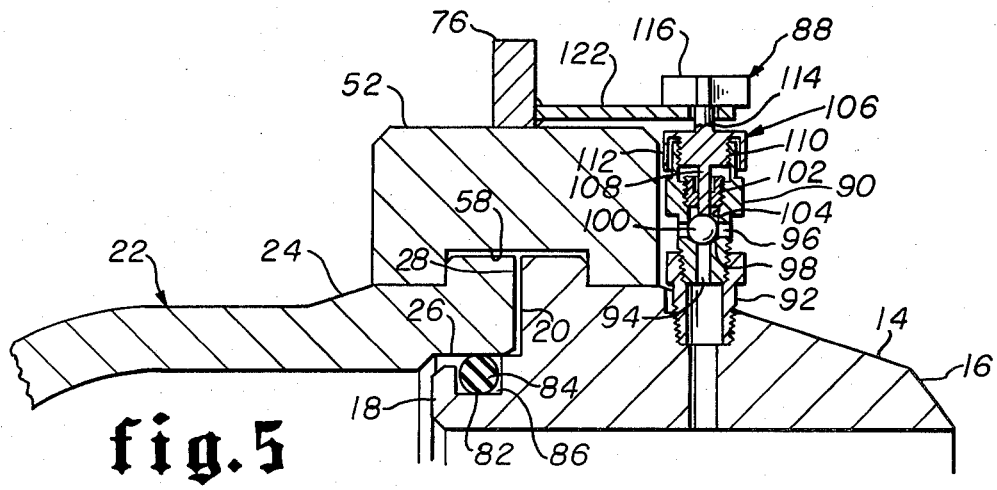
FIG. 5 is a view of the embodiment shown in FIG. 1 taken in the direction of arrows 5—5.

Means 44 are used for clamping door 22 to collar 14 and this means includes a semicircular section 46 having a lower end 48 and an upper end 50 and a semicircular section 52 with a lower end 54 and an upper end 56. When ends 48 and 54 and the other ends 50 and 56 are positioned adjacent one another, clamping means 44 forms a ring around the pipe. As shown in FIG. 5, the ring has a channel 58, in its inner surface to provide lips or inturned flanges which engage the outturned flange portions 20 and 28. Arms 58 and 60 extend from semicircular portions 46 and 52, respectively, and are pivotally joined to pin 62, which is mounted to a pivot plate 64 attached to the lower portion of collar 14 and thereby hinge the ends together.

A latching assembly 66, as best shown in FIGS. 1-4, is connected to upper ends 50 and 56 of semicircular sections 46 and 52 for moving these ends together and apart. This assembly uses a mechanical linkage interconnecting a support plate 68, which extends radially from semicircular section 46 at upper end 50, and a support plate 70 which extends radially from semicircular section 52 at upper end 56. The mechanical linkage includes spacer 72 disposed on either side of plates 68 and outwardly of spacers 72 are arms 74 with a pin 76 extending through arms 74 for pivotally mounting them to support arms 68. The outer end of arms 74 are pivotally connected to a handle 76 by a pin 78. The forked portion of handle 76 has tines disposed on either side of plate 70, the tines being pivotally connected to support plate 70 by a pin 80. Thus, handle 76 is raised to the position shown in FIG. 2, to move ends 50 and 56 away from one another and thereby unclamp door 22 from collar 14 or is moved downwardly to the position shown in FIG. 1 to move the ends toward one another and thereby clamp door 22 to collar 14. Latching assembly 66 is such that the pivoting axis of pin 78 is below a plane drawn through the pivoting axis of pin 76 and 80 to thereby provide a self-locking apparatus when the door is clamped to the collar.

As best shown in FIG. 5, a sealing means 82 is provided on collar 14 to prevent communication between the interior of the pipe and the atmosphere when door 12 is clamped to the collar. Preferably, this takes the form of an O-ring 84 disposed in a channel 86 formed in an outwardly facing surface of male portion 18.

As best shown in FIGS. 3 and 5, a testing valve 88 is used to indicate the presence of pressurized fluid in the trap. This testing valve includes a housing 90 connected to collar 14, as by connecting insert 92, and has an inlet passage 94 in communication with the interior of pipe 12, an outlet passage 96, preferably extending transversally to the inlet passage, in communication with the inlet passage and the atmosphere, and a seat 98 protected within the housing intermediate of the inlet and outlet passages. A ball 100 is disposed within housing 90 for engaging with seat 98 to prevent communication between the inlet and outlet passages. This ball may be retained within housing 90 by means of a plug 102 having threads disposed on its exterior surface for engaging threads in a connecting passage 104, which is substantially aligned with inlet passage 94. A stem assembly 106 is provided for urging the ball toward the seat and has a push rod 108 extending through a hole in plug 102 for contacting the ball. Also, the assembly 106 has threads 110 for engaging with the threads on the housing to move the push rod toward or away from the seat by turning the assembly within housing 90. The presence of pressurized fluid is then indicated by fluid flowing into the atmosphere when the push rod is moved away from seat 98. A sleeve 112 is attached to stem assembly 106 outwardly of threads 110 for protecting them when the stem assembly is removed from housing 90. A stem 114 extends outwardly above threads 110 and sleeve 112 with a knob 116 being attached thereto. Such knob is used to rotate the assembly within housing 90 and thereby move push rod 108 toward and away from seat 98.

A means 120 connects testing valve 88 to handle 76 for preventing movement of the handle to open door 22 until after the push rod is moved away from the seat which tests for the presence of pressurized fluid within the pipe. This movement preventing means includes safety lock arm 122 attached to handle 76 to extend toward the valve. Connecting stem 114 extends outwardly through a hole in arm 122 and the knob is sufficiently larger than the diameter of the hole in the arm to prevent movement of the handle until after knob 116 has been turned and the stem assembly removed from the housing so that the trap is tested for the presence of pressurized fluid.

As best shown in FIGS. 1–3, a safety clamp ring latch 124 is provided between the two upper ends 50 and 56 of semicircular section 46 and 52, respectively. On end of the latch is fastened to semicircular section 46 by two screws 126 and to semicircular section 52 by a single screw 128. The end that supports screw 128 is curved to bend away from the front edge of clamp 44 to aid in preventing damage to the latch when the ends of the semicircular section are moved toward one another.

The invention having been described, what is claimed is:

1. A pig trap closure, comprising:
   a collar adapted to be attached to the end of a pipe which is to receive a pig;
   a door pivotally connected to the collar for opening and closing the end of the pipe;
   means for clamping the door to the collar including semicircular sections forming a clamping ring around the pipe, lips being provided on the inner surface of the ring for engaging with portions on the door and collar, one end of the sections being hinged together and the other ends being movable together for clamping the door to the collar when the lips engage the portions on the door and collar and apart for unclamping the door from the collar;
   a latching mechanism for moving the other ends together and apart including a mechanical linkage pivotally connected to each of these ends and a handle attached to the linkage for controlling movement of these ends between opened and closed positions;
   fluid energized sealing means provided on the collar for preventing communication between the interior of the pipe and the atmosphere when the door is clamped to the collar;
   a testing valve for indicating the presence of pressurized fluid in the pipe including
      a housing connected to the collar having an inlet passage in communication with the interior of the pipe,
      an outlet passage in communication with the inlet passage and the atmosphere,
      a seat within the housing intermediate of the inlet and outlet passages,
      a ball disposed within the housing for engaging with the seat to prevent communication between the inlet and outlet passages, and
   a stem assembly for urging the ball toward the seat having
      a push rod extending into the housing for contacting the ball and threads for engaging mating threads on the housing to move the push rod toward and away from the seat, the presence of pressurized fluid being indicated by fluid flowing through the housing into the atmosphere when the push rod is moved away from the seat; and
   means connecting the testing valve to the handle for preventing movement of the handle to open the door until after the push rod is moved away from the seat and the stem assembly removed from the housing to test for the presence of pressurized fluid within the pipe.

2. The closure as set forth in claim 1, wherein the movement preventing means includes a safety lock arm attached to the handle, the stem assembly includes a stem extending outwardly through a hole in the arm, and a knob attached to the stem for turning the stem assembly to move the push rod toward or away from the seat, the knob having a size larger than the hole in the safety lock arm to prevent opening the door by moving the handle without first testing for the presence of fluid by turning the knob.

3. The closure as set forth in claim 1, wherein the testing valve housing includes a connecting passage substantially aligned with the inlet passage and the outlet passage extends substantially transversally to the inlet passage, a plug for retaining the ball within the housing being threadedly engaged in the connecting passage and the push rod extends through a hole in the plug to contact the ball.

4. The closure as set forth in claim 3, testing valve stem assembly includes a sleeve disposed around the threads for protection when the assembly is removed from the housing.

5. The closure as set forth in claim 4, wherein the movement preventing means includes a safety lock arm attached to the handle, and the stem assembly includes a stem extending outwardly through a hole in the arm, a knob attached to the stem for turning the stem assembly to move the rod toward or away from the seat, the knob having a size larger than the hole in the handle to prevent opening the door by moving of the handle without first testing for the presence of fluid by turning the knob.

6. The closure as set forth in claim 5, wherein the collar includes a body having a male portion extending away from the end of the collar which is to be attached to the pipe and a flange portion extending outwardly around the collar, the door includes a body having a female portion for telescoping over the male portion when the door is closed and a flange portion extending outwardly around the door edge, the lips on the clamping means engaging with the flange portions for clamping the door to the collar, and the sealing means includes a sealing ring supported in a groove formed in an outwardly facing surface of the male portion, the female portion having an inwardly facing surface forming a bore in the door edge, the bore having a depth sufficient to permit variations in the spacing between abutting shoulders on the flange portions while maintaining sealing contact between the female portion surface and sealing ring.

* * * * *